US012444262B2

(12) United States Patent
Yamada et al.

(10) Patent No.: US 12,444,262 B2
(45) Date of Patent: Oct. 14, 2025

(54) PAPER SHEET HANDLING APPARATUS

(71) Applicants: FUJITSU FRONTECH LIMITED, Tokyo (JP); FUJITSU FRONTECH SYSTEMS LIMITED, Maebashi (JP)

(72) Inventors: Akira Yamada, Inagi (JP); Tomoyuki Tamahashi, Inagi (JP); Takashi Wada, Inagi (JP); Atsushi Ando, Inagi (JP); Shohei Koizumi, Inagi (JP); Satoshi Hayashi, Inagi (JP); Yasuhiro Motohashi, Inagi (JP)

(73) Assignees: FUJITSU FRONTECH LIMITED, Tokyo (JP); FUJITSU FRONTECH SYSTEMS LIMITED, Maebashi (JP)

( * ) Notice: Subject to any disclaimer, the term of this patent is extended or adjusted under 35 U.S.C. 154(b) by 258 days.

(21) Appl. No.: 18/357,508

(22) Filed: Jul. 24, 2023

(65) Prior Publication Data

US 2023/0368598 A1 Nov. 16, 2023

Related U.S. Application Data

(63) Continuation of application No. PCT/JP2021/006536, filed on Feb. 22, 2021.

(51) Int. Cl.
*G07D 11/14* (2019.01)
*B65H 29/00* (2006.01)

(52) U.S. Cl.
CPC ............. *G07D 11/14* (2019.01); *B65H 29/00* (2013.01); *B65H 2701/1912* (2013.01)

(58) Field of Classification Search
CPC ............ B65H 1/025; B65H 2701/1912; G07D 11/14; G07D 2211/00
See application file for complete search history.

(56) References Cited

U.S. PATENT DOCUMENTS 9,721,417 B2 * 8/2017 Akagi .................. G07F 19/202
10,013,838 B2 * 7/2018 Qu ........................ G07D 11/00
(Continued)

FOREIGN PATENT DOCUMENTS

JP 2006004039 A 1/2006
JP 2009098835 A 5/2009
(Continued)

OTHER PUBLICATIONS

Search Report issued in corresponding Europepan patent application No. EP21926609.5, dated Mar. 25, 2024.
(Continued)

*Primary Examiner* — Howard J Sanders
(74) *Attorney, Agent, or Firm* — Greer Burns & Crain Ltd.

(57) ABSTRACT

A paper sheet handling apparatus includes: a partition portion that forms an insertion space into which a paper sheet is inserted from an insertion port with a first opposing portion, and forms a taking-out space from which the paper sheet is taken out from the insertion port with a second opposing portion; and a conveyor that conveys the paper sheet left in the taking-out space in a state of protruding toward the taking-out space from a first opening portion of the first opposing portion and a second opening portion of the partition portion. The partition portion includes a second shutter that openably closes the second opening portion, and a second shutter opening/closing unit that opens the second opening portion by opening the second shutter in conjunction with an operation in which the partition portion moves to the remaining banknote conveyance position.

3 Claims, 17 Drawing Sheets

(56) References Cited

U.S. PATENT DOCUMENTS

| | | | | |
|---|---|---|---|---|
| 12,175,821 | B2 * | 12/2024 | Dusterhus | G07D 11/14 |
| 2012/0031728 | A1 * | 2/2012 | Lee | G07F 19/20 194/342 |
| 2022/0392291 | A1 * | 12/2022 | Deguchi | G07D 11/40 |
| 2022/0392292 | A1 * | 12/2022 | Ando | G07D 11/14 |
| 2022/0392293 | A1 * | 12/2022 | Yamada | G07D 11/14 |

FOREIGN PATENT DOCUMENTS

| | | | | |
|---|---|---|---|---|
| JP | 2010108159 | A | 5/2010 | |
| JP | 2012073875 | A | 4/2012 | |
| JP | 5342530 | B2 * | 11/2013 | B65H 29/22 |
| JP | 6165652 | B | 7/2017 | |
| JP | 6308675 | B2 * | 4/2018 | |

OTHER PUBLICATIONS

ISR issued in PCT/JP2021/006536, mailed Apr. 20, 2021.
Written Opinion issued in PCT/JP2021/006536, dated Apr. 20, 2021.

* cited by examiner

PAPER SHEET HANDLING APPARATUS

CROSS-REFERENCE TO RELATED APPLICATION

This application is continuation application of International Application PCT/JP2021/006536 filed on Feb. 22, 2021 and designated the U.S., the entire contents of which are incorporated herein by reference.

FIELD

The embodiments discussed herein are related to a paper sheet handling apparatus.

BACKGROUND

Conventionally, there has been proposed a paper sheet deposit/withdrawal apparatus including a first moving member that sandwiches a paper sheet from a side close to a feeding unit among a pair of moving members that sandwich the paper sheet inserted from a customer and moves from a position at the time of inserting the paper sheet to the feeding unit, rollers of the feeding unit that protrude from a gap on the first moving member to a storage space of the paper sheet and convey the paper sheet, and a shielding member that is driven by a motor to close the gap when the first moving member is at the position at the time of inserting the paper sheet and to retreat when the first moving member moves to the feeding unit.

Related Art Document: Japanese Patent No. 6165652

SUMMARY

A paper sheet handling apparatus of the disclosure includes: a first opposing portion and a second opposing portion arranged to be opposed to each other; a partition portion that is arranged so as to be movable in an opposing direction in which the first opposing portion and the second opposing portion are opposed to each other, forms an insertion space into which a paper sheet is inserted from an insertion port with the first opposing portion, and forms a taking-out space from which the paper sheet is taken out from the insertion port with the second opposing portion; and a conveyor that conveys the paper sheet inserted in the insertion space in a state of protruding toward the insertion space from a first opening portion of the first opposing portion, and conveys the paper sheet left in the taking-out space in a state of protruding toward the taking-out space from the first opening portion of the first opposing portion and a second opening portion of the partition portion, in which the partition portion is arranged so as to be movable to a remaining banknote conveyance position when the paper sheet left in the taking-out space is conveyed by the conveyor, and in which the partition portion includes a second shutter that openably closes the second opening portion, and a second shutter opening/closing unit that opens the second opening portion by opening the second shutter in conjunction with an operation in which the partition portion moves to the remaining banknote conveyance position.

The object and advantages of the present invention will be realized by the elements set forth in the claims or combinations thereof.

DESCRIPTION OF EMBODIMENTS

Incidentally, in an automatic transaction apparatus such as an automated teller machine (ATM), a banknote deposit/withdrawal unit is arranged in order to insert a banknote to be deposited and in order to take out a banknote to be withdrawn. As such a banknote deposit/withdrawal unit as described above, there is a banknote deposit/withdrawal unit including: a stage and a roof which are arranged to be opposed to each other across an insertion space into which paper sheets are inserted from an insertion port; and a conveying unit that conveys the paper sheets inserted into this insertion space in a state of protruding from an opening portion of the stage toward the insertion space.

In such a banknote deposit/withdrawal unit, by arranging a partition portion (pusher) between the stage and the roof, an insertion space into which a banknote is inserted can be formed between the stage and the partition portion, and a taking-out space from which a banknote is withdrawn can be formed between the partition portion and the roof.

In the case where the partition portion is arranged as described above, when the banknote left in the taking-out space is taken in, it is conceivable that an opening portion is formed not only in the opening portion of the stage but also in the partition portion, and the banknote inserted into the insertion space is conveyed in a state where the conveying unit protrudes toward the insertion space from the opening portion of the stage and the opening portion of the partition portion.

However, when the opening portion is provided in the partition portion, foreign matter can pass through the partition portion to move to the stage side (insertion space side) and the roof side (taking-out space side). Therefore, when the opening portion of the partition portion is closed by arranging the above-described shielding member and motor, the motor is required, and a power transmission mechanism for transmitting power from the motor to the shielding member is required. Therefore, the structure of the banknote deposit/withdrawal unit becomes complicated.

Hereinafter, a paper sheet handling apparatus according to an embodiment of the present invention will be described with reference to the drawings using an automatic transaction apparatus 100 as an example.

Figure 1:
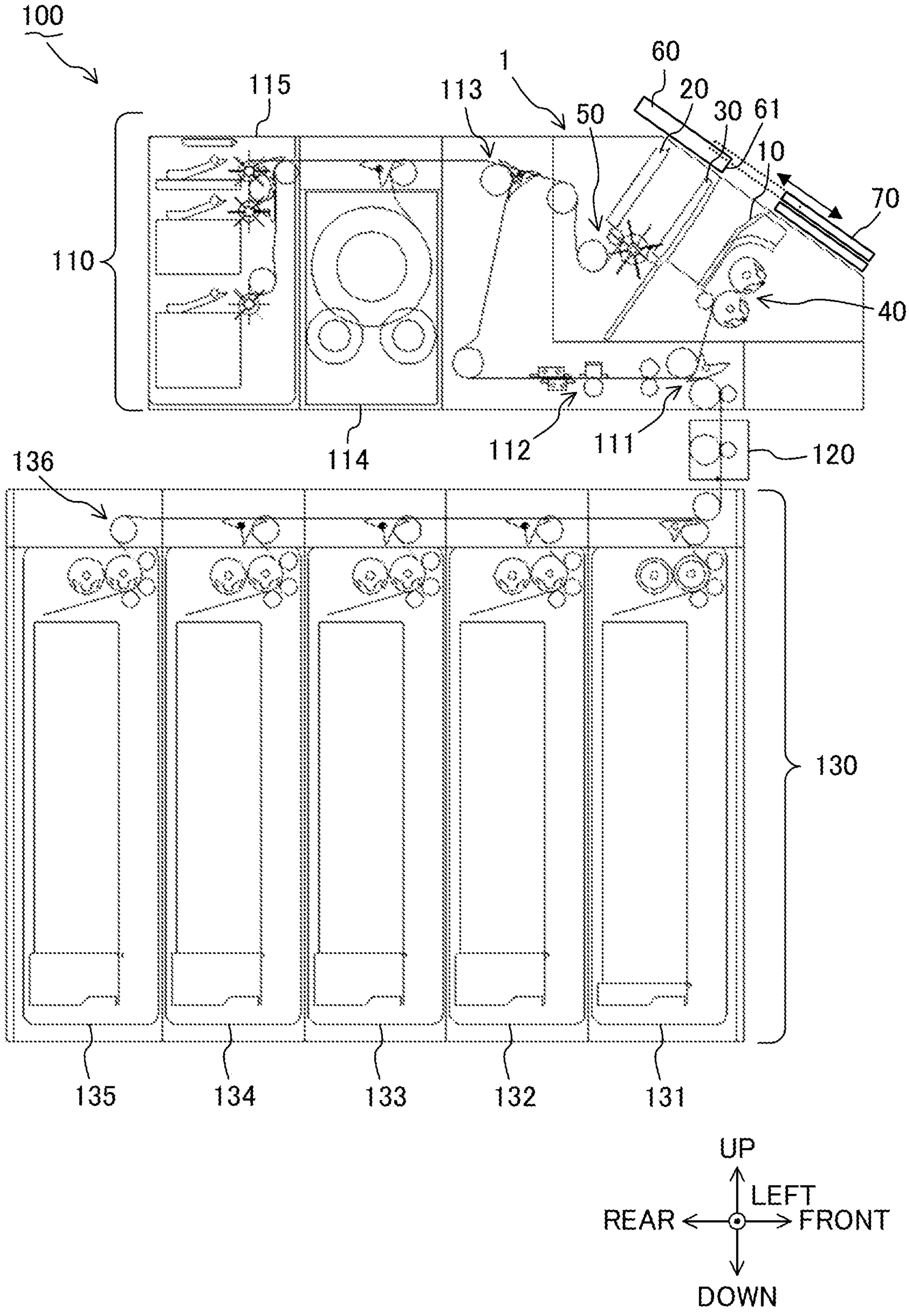
FIG. 1 is a left side view illustrating an internal configuration of an automatic transaction apparatus in an embodiment.

FIG. 1 is a left side view illustrating an internal configuration of the automatic transaction apparatus 100.

Note that the up and down, front and back, and left-right directions illustrated in FIG. 1 and FIGS. 2A to 4B to be described later are merely an example of a case where a customer side of the automatic transaction apparatus 100 is the front direction, but for example, the up-down direction is a vertical direction, and the front-back direction and the left-right direction are horizontal directions.

The automatic transaction apparatus 100 illustrated in FIG. 1 is, for example, an ATM, a bill recycle unit (BRU), a cash dispenser (CD), a teller cash recycler (TCR), or the like, and includes a main body unit 110, an intermediate conveying unit 120, and a storage unit 130. As an example, the main body unit 110 and the storage unit 130 are arranged in different spaces via a partition (not illustrated) interposed therebetween, and the intermediate conveying unit 120 conveys a banknote B (see FIG. 2A) so as to penetrate the partition. Note that the banknote B is an example of a paper sheet.

The main body unit 110 includes a banknote deposit/withdrawal unit 1, conveying units 111 and 113, a distinguishing unit 112, a temporarily holding unit 114, and a reject unit 115.

Figure 10:
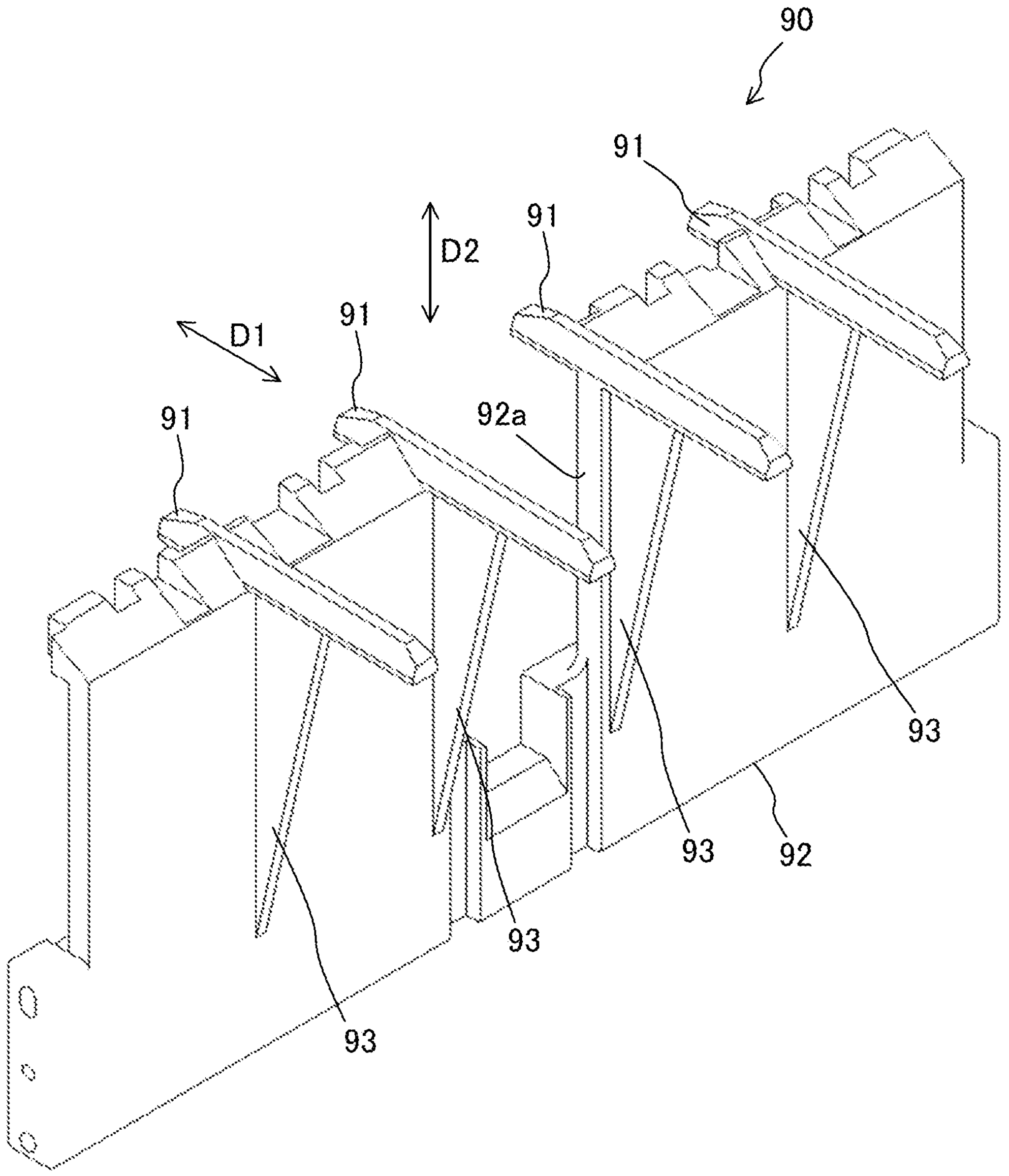
FIG. 10 is a perspective view illustrating a banknote receiving portion in the embodiment.

The banknote deposit/withdrawal unit 1 includes a stage 10, a roof 20, a pusher 30, a taking-in and conveying unit 40, a discharge conveying unit 50, a front panel 60, a shutter 70, a first contact portion 80 (see FIG. 3A), and a banknote receiving portion 90 (see FIG. 10). Note that only the banknote deposit/withdrawal unit 1 can be regarded as an example of the paper sheet handling apparatus.

The stage 10, the roof 20, the pusher 30, the taking-in and conveying unit 40, the first contact portion 80, and the banknote receiving portion 90 will be described later with reference to FIGS. 3A to 3C, 4A and 4B, and FIGS. 5 to 10, but the taking-in and conveying unit 40 conveys the banknote B inserted from the insertion/taking-out port 61 to the insertion space S1 (see FIG. 3A) between the stage 10 and the pusher 30 to take the banknote B into the automatic transaction apparatus 100. In addition, the taking-in and conveying unit 40 conveys the banknote B for withdrawal left without being taken out in a taking-out space S2 (see FIG. 4A) between the pusher 30 and the roof 20 to take the banknote B into the automatic transaction apparatus 100.

The discharge conveying unit 50 illustrated in FIG. 1 discharges the banknote B between the roof 20 and the pusher 30.

On an upper front surface of the automatic transaction apparatus 100, the front panel 60 is disposed to be inclined with respect to the vertical direction and the horizontal direction so as to be located rearward as going upward. The front panel 60 is provided with an insertion/taking-out port 61.

The shutter 70 openably closes the insertion/taking-out port 61, which is an example of an insertion port, through which the banknote B (paper sheet) is inserted. Note that, in FIG. 1, the shutter 70 in an opened state is illustrated by a solid line, and the shutter 70 in a closed state is illustrated by a dotted line.

The conveying unit 111 conveys the banknote B from the banknote deposit/withdrawal unit 1 to the distinguishing unit 112, and conveys the banknote B between the distinguishing unit 112 and the intermediate conveying unit 120.

The distinguishing unit 112 determines authenticity, contamination, corner breakage, and the like of the banknote B.

The conveying unit 113 conveys the banknote B between the distinguishing unit 112 and the temporarily holding unit 114, and conveys the banknote B from the distinguishing unit 112 to the banknote deposit/withdrawal unit 1.

The temporarily holding unit 114 temporarily stores the banknote B that is inserted into the banknote deposit/withdrawal unit 1 and determined to be normal in the distinguishing unit 112.

The reject unit 115 stores a banknote B, which is not to be returned, among such banknotes B determined to be abnormal in the distinguishing unit 112.

The intermediate conveying unit 120 conveys the banknote B between the main body unit 110 and the storage unit 130.

The storage unit 130 is disposed below the main body unit 110, and includes a plurality of banknote storage cassettes 131, 132, 133, 134, and 135, and a storage conveying unit 136.

The plurality of banknote storage cassettes 131 to 135 store, for example, such banknotes B of which money types are different from one another. The banknote storage cassettes 131 to 135 can eject the stored banknotes B. Therefore, the banknotes B stored in the banknote storage cassettes 131 are 135 are used for withdrawal.

The storage conveying unit 136 conveys the banknotes B between the intermediate conveying unit 120 and the respective banknote storage cassettes 131 to 135.

Figure 2A:
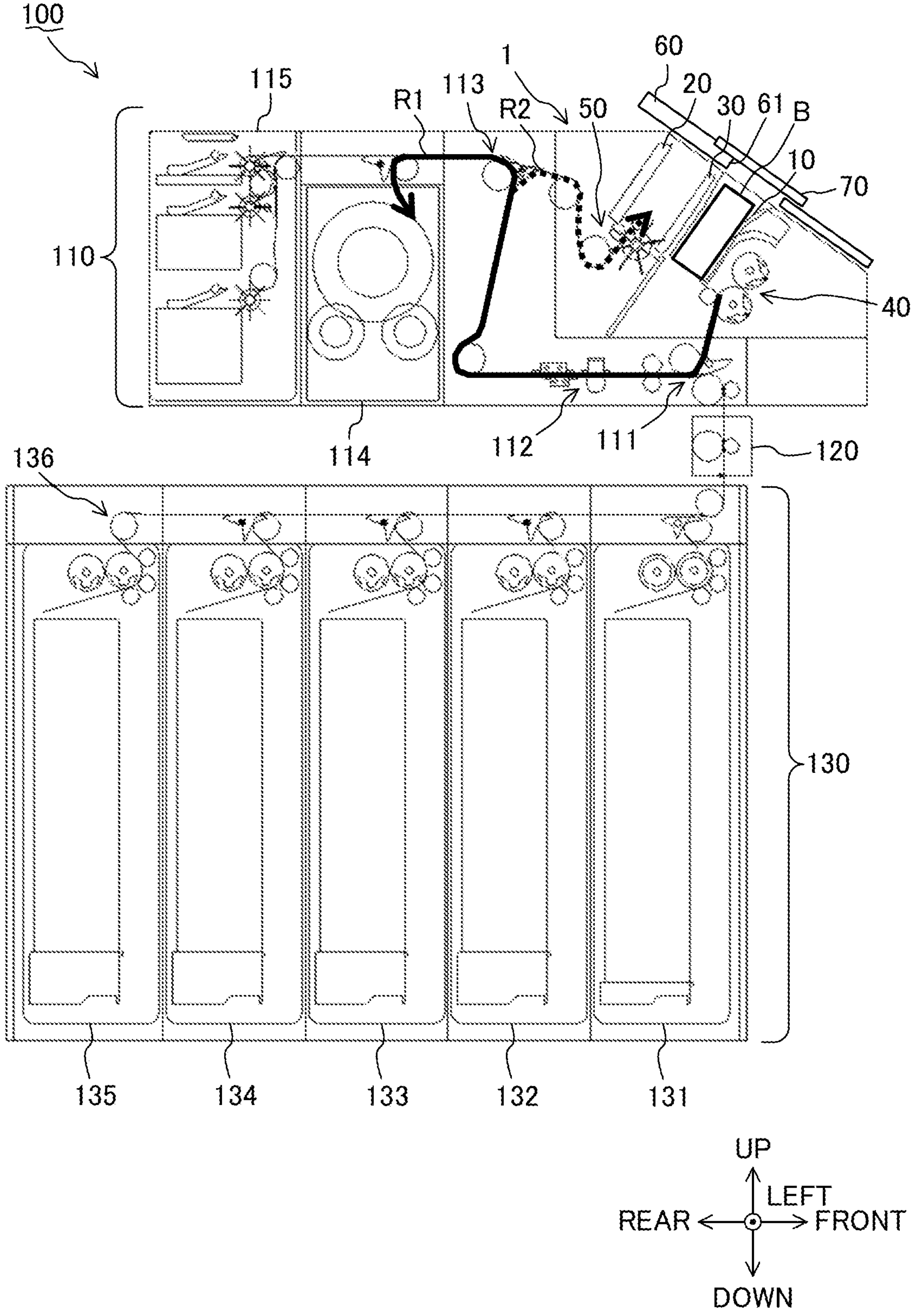
FIG. 2A is an explanatory diagram (1) for explaining a conveyance route of a banknote of the automatic transaction apparatus in the embodiment.
Figure 2B:
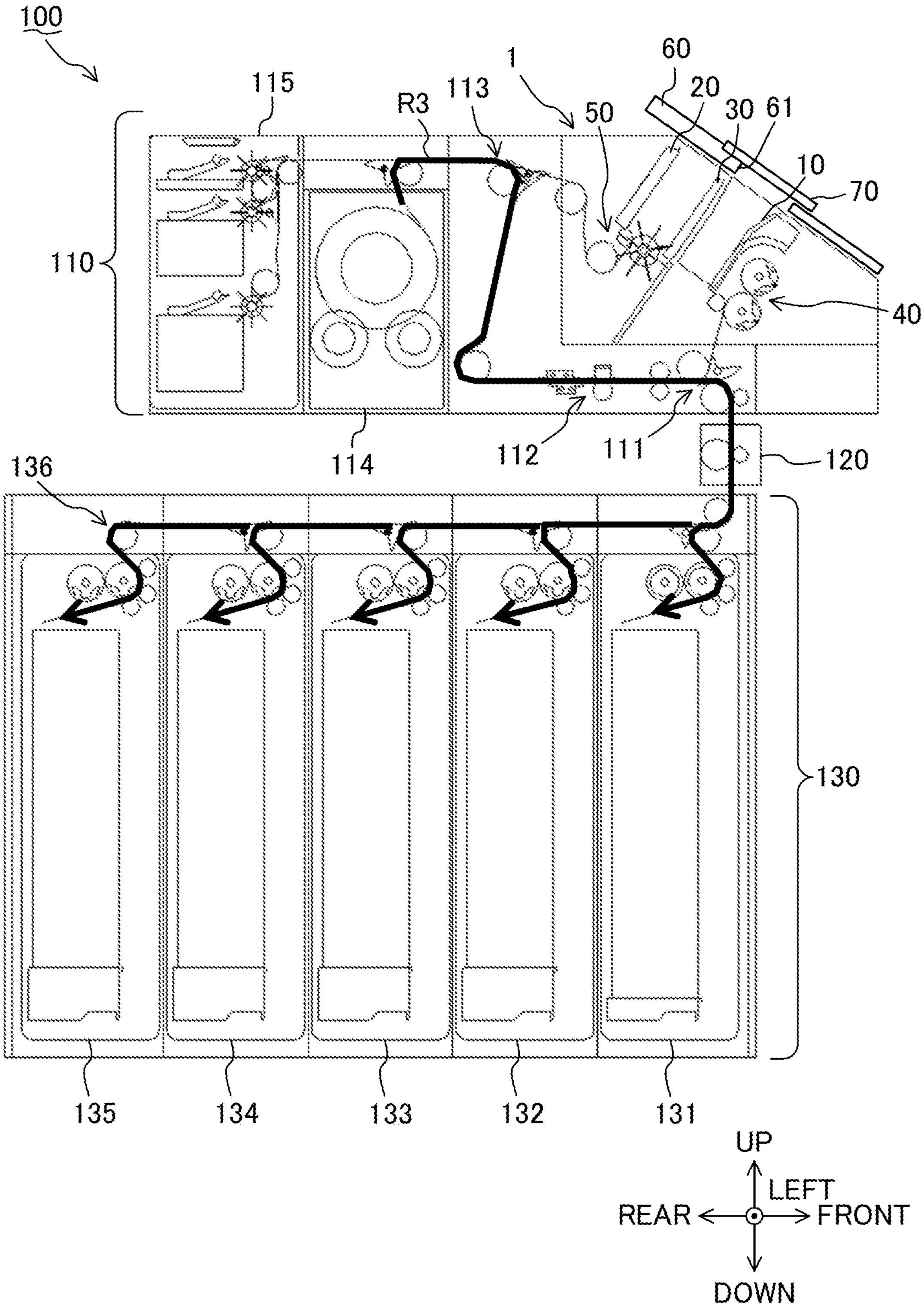
FIG. 2B is an explanatory diagram (2) for explaining a conveyance route of a banknote of the automatic transaction apparatus in the embodiment.
Figure 2C:
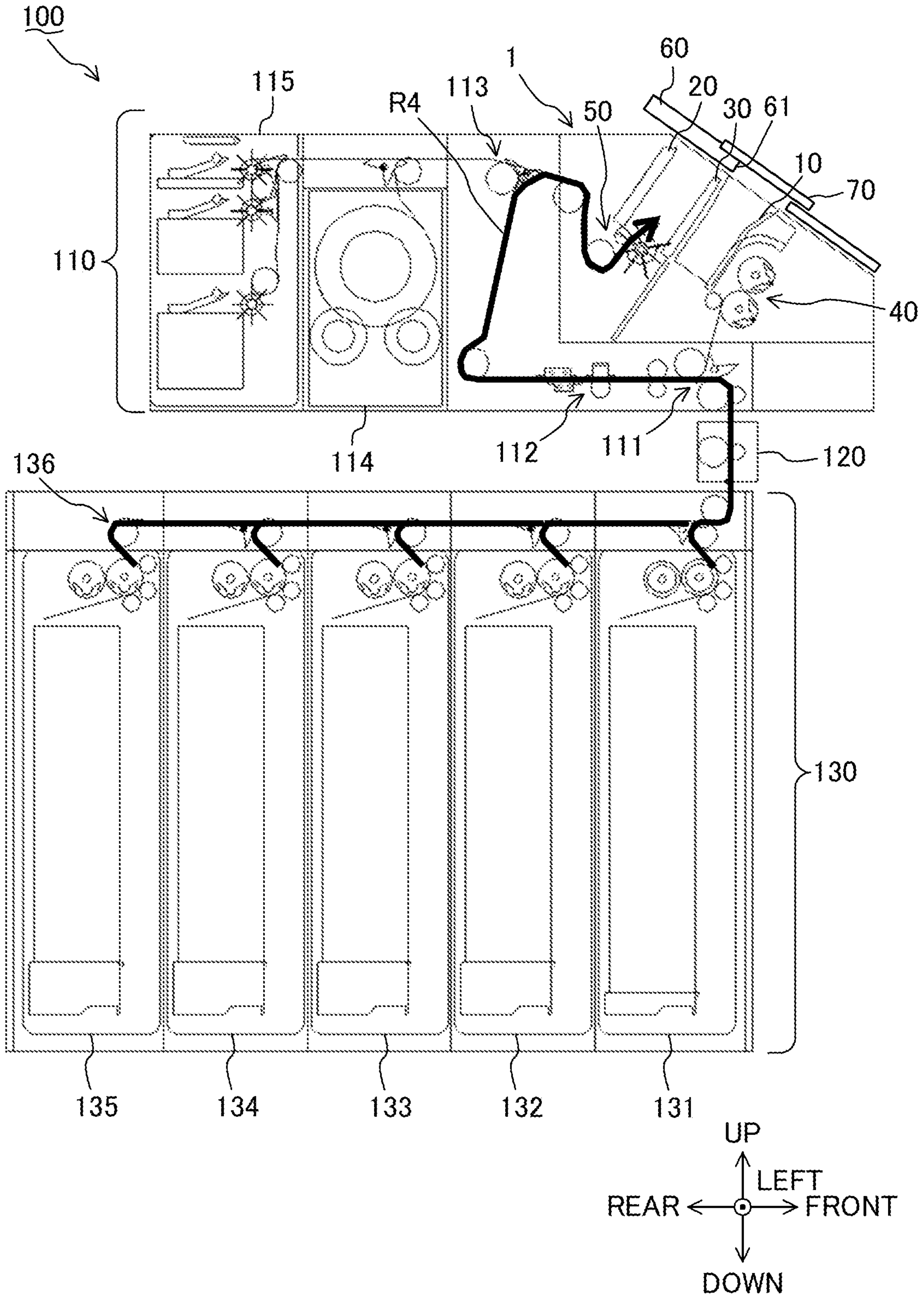
FIG. 2C is an explanatory diagram (3) for explaining a conveyance route of a banknote of the automatic transaction apparatus in the embodiment.

FIGS. 2A to 2C are explanatory views for explaining conveyance routes R1 to R4 of the automatic transaction apparatus 100 for the banknotes B.

First, as in the conveyance route R1 indicated by a thick solid arrow in FIG. 2A, the banknote B inserted into the banknote deposit/withdrawal unit 1 is conveyed to the distinguishing unit 112 by the taking-in and conveying unit 40 and the conveying unit 111. Further, the banknote B determined to be normal in the distinguishing unit 112 is conveyed to the temporarily holding unit 114 by the conveying unit 113.

Meanwhile, as in the conveyance route R2 indicated by a thick dotted arrow in FIG. 2A, the banknote B (counterfeit banknote and the like) determined to be abnormal in the distinguishing unit 112 is returned to the banknote deposit/withdrawal unit 1 by the conveying unit 113 and the discharge conveying unit 50.

As in the conveyance route R3 indicated by a thick solid arrow in FIG. 2B, the banknotes B temporarily stored in the temporarily holding unit 114 are conveyed to the respective banknote storage cassettes 131 to 135 by the conveying unit

113, the distinguishing unit 112, the conveying unit 111, the intermediate conveying unit 120, and the storage conveying unit 136.

As in the conveyance route R4 indicated by a thick solid arrow in FIG. 2C, the banknotes B stored in the respective banknote storage cassettes 131 to 135 are discharged, at the time of withdrawal, to the banknote deposit/withdrawal unit 1 by the storage conveying unit 136, the intermediate conveying unit 120, the conveying unit 111, the distinguishing unit 112, the conveying unit 113, and the discharge conveying unit 50.

Next, a depositing operation and a remaining banknote taking-in operation of the banknote deposit/withdrawal unit 1 will be described.

Figure 3A:
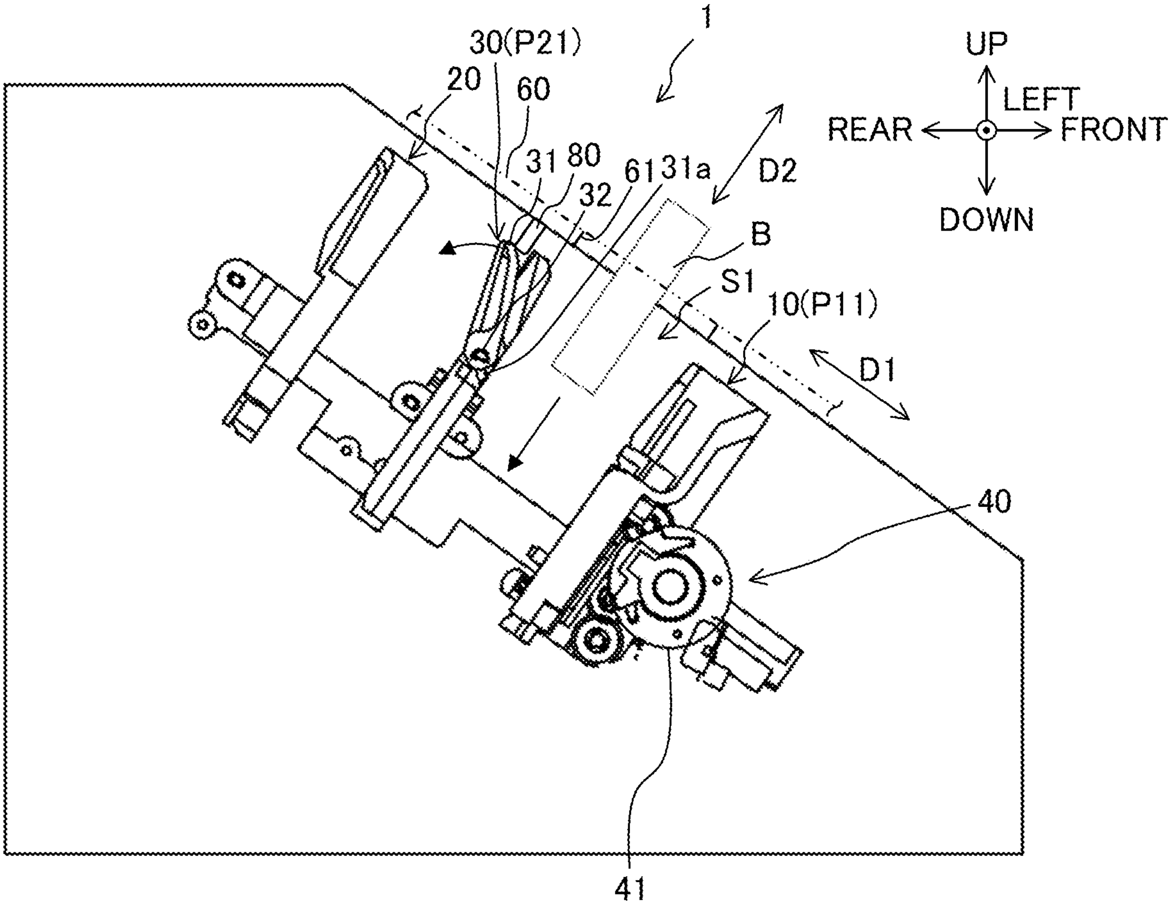
FIG. 3A is an explanatory view (1) for explaining a depositing operation of a banknote deposit/withdrawal unit in the embodiment.
Figure 3B:
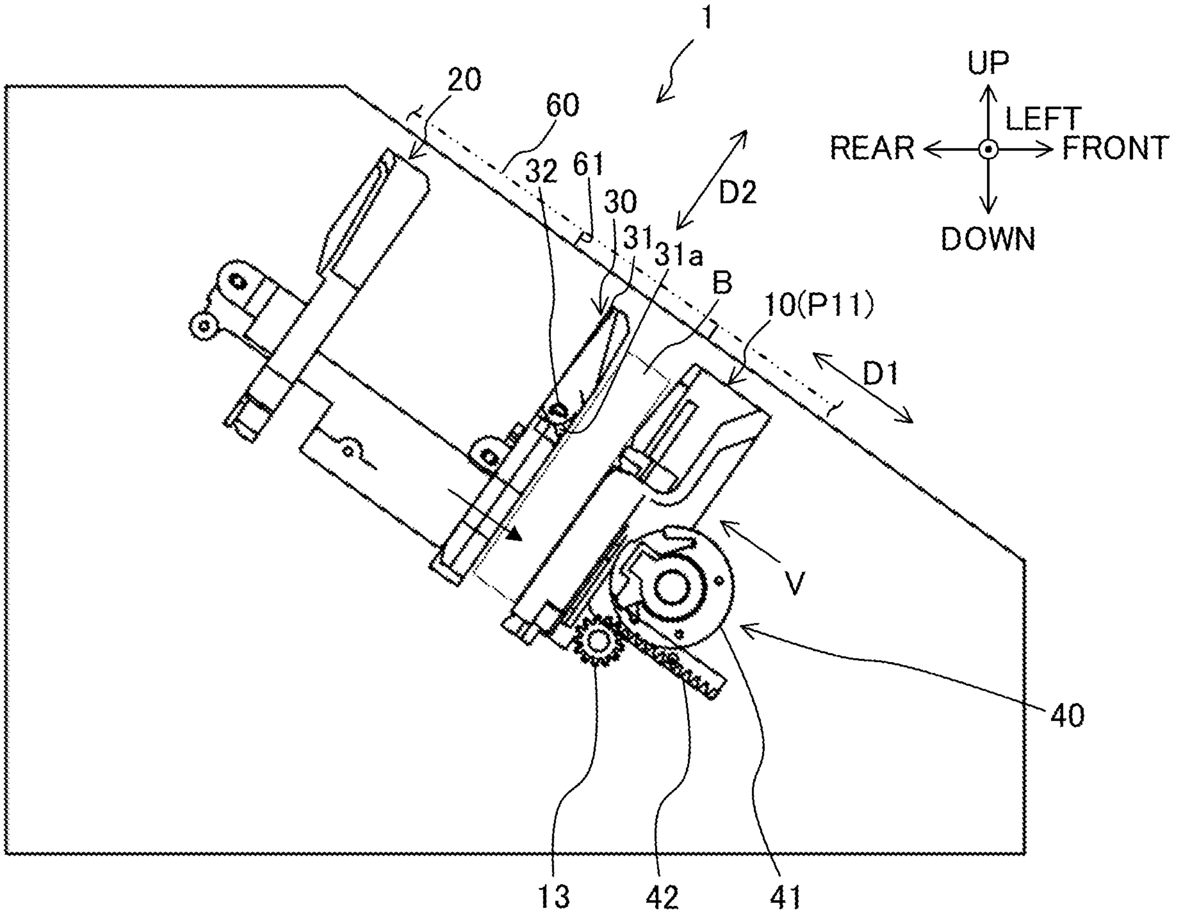
FIG. 3B is an explanatory view (2) for explaining the depositing operation of the banknote deposit/withdrawal unit in the embodiment.
Figure 3C:
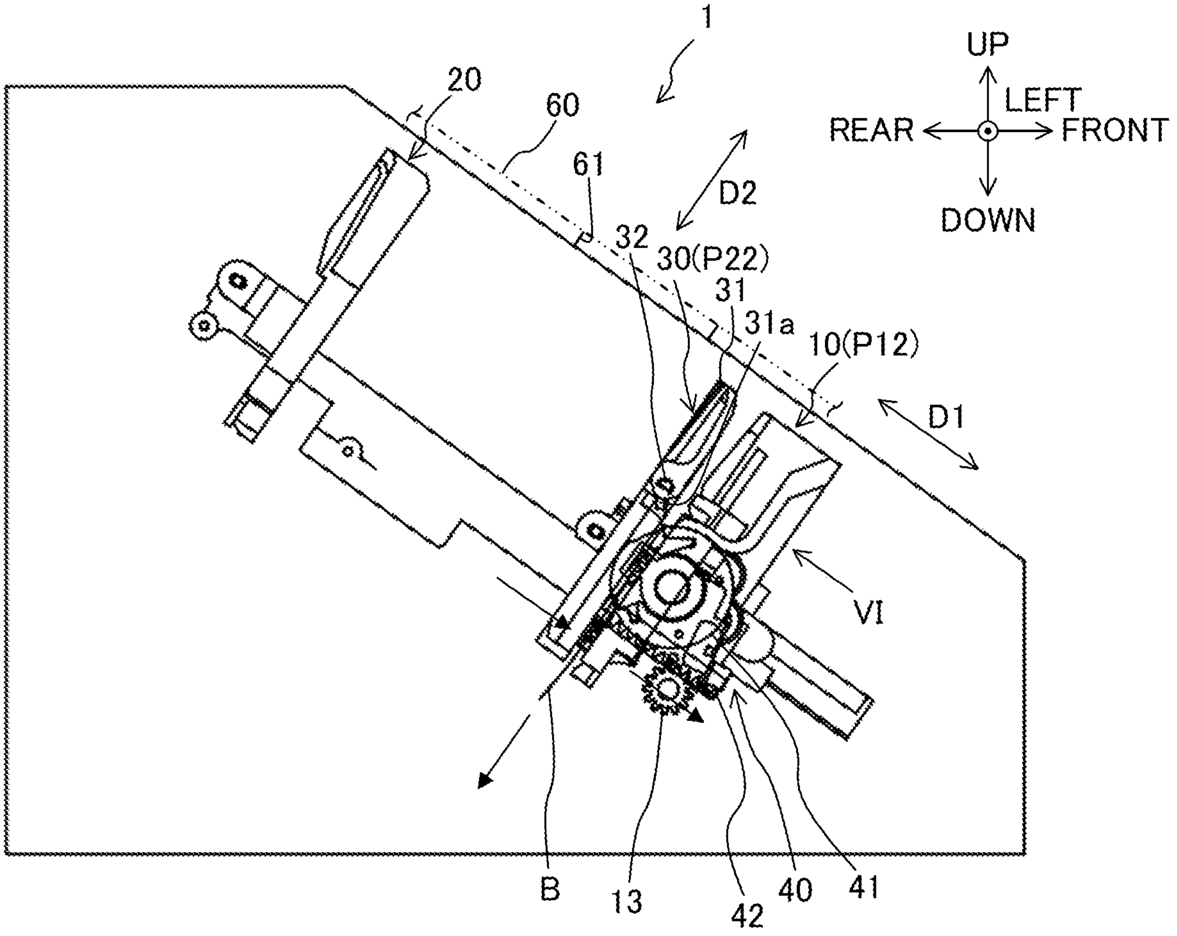
FIG. 3C is an explanatory view (3) for explaining the depositing operation of the banknote deposit/withdrawal unit in the embodiment.

FIGS. 3A to 3C are explanatory diagrams for explaining the depositing operation of the banknote deposit/withdrawal unit 1.

Figure 4A:
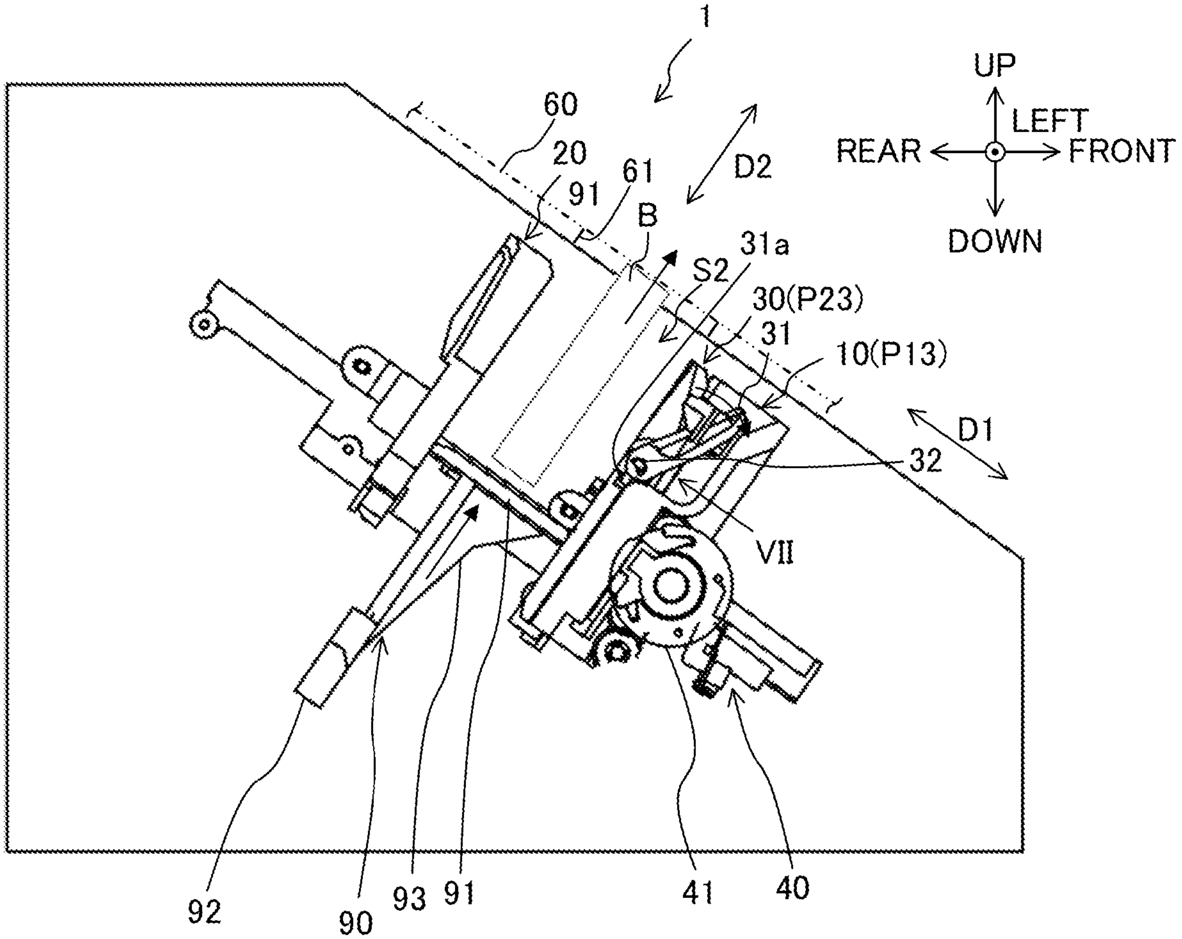
FIG. 4A is an explanatory view (1) for explaining a remaining banknote taking-in operation of the banknote deposit/withdrawal unit in the embodiment.
Figure 4B:
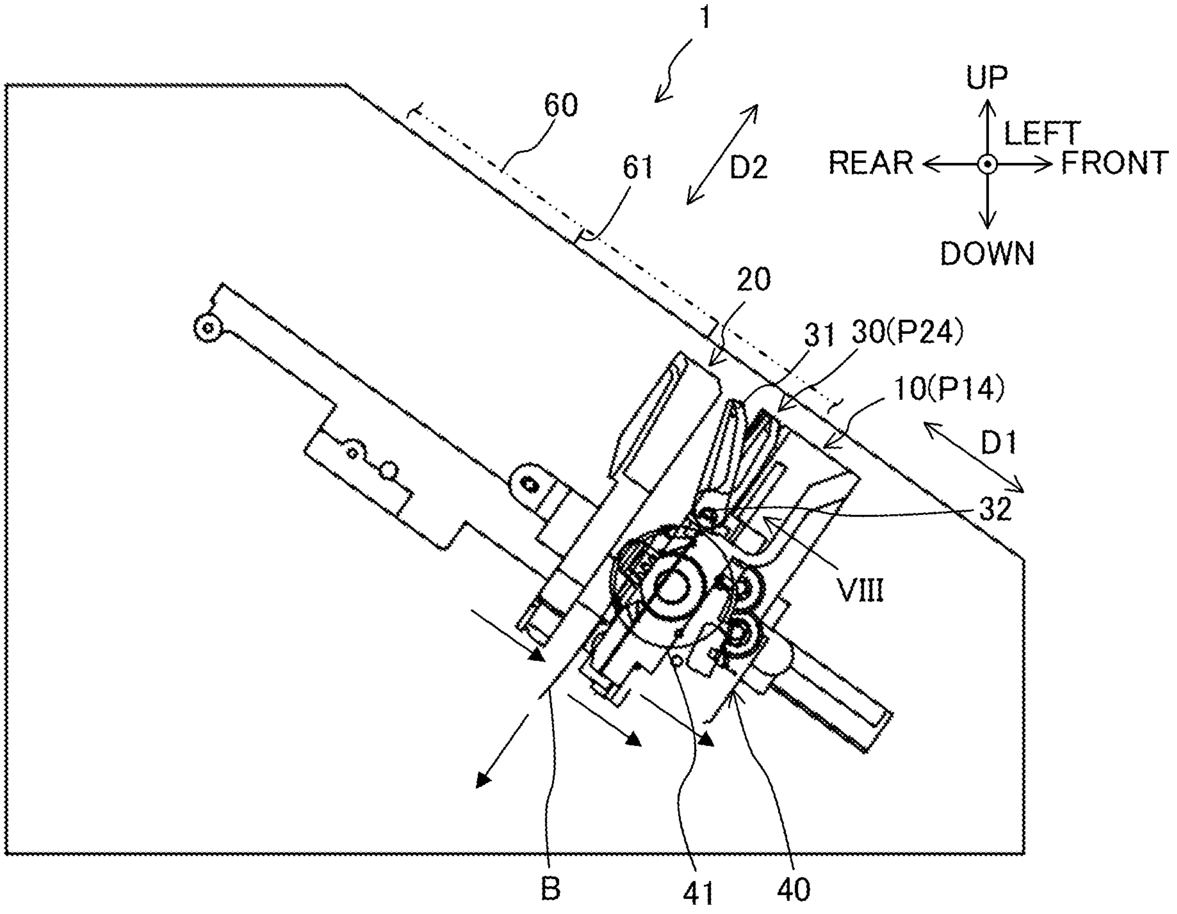
FIG. 4B is an explanatory view (2) for explaining the remaining banknote taking-in operation of the banknote deposit/withdrawal unit in the embodiment.

FIGS. 4A and 4B are explanatory diagrams for explaining the remaining banknote taking-in operation of the banknote deposit/withdrawal unit 1.

Figure 5:
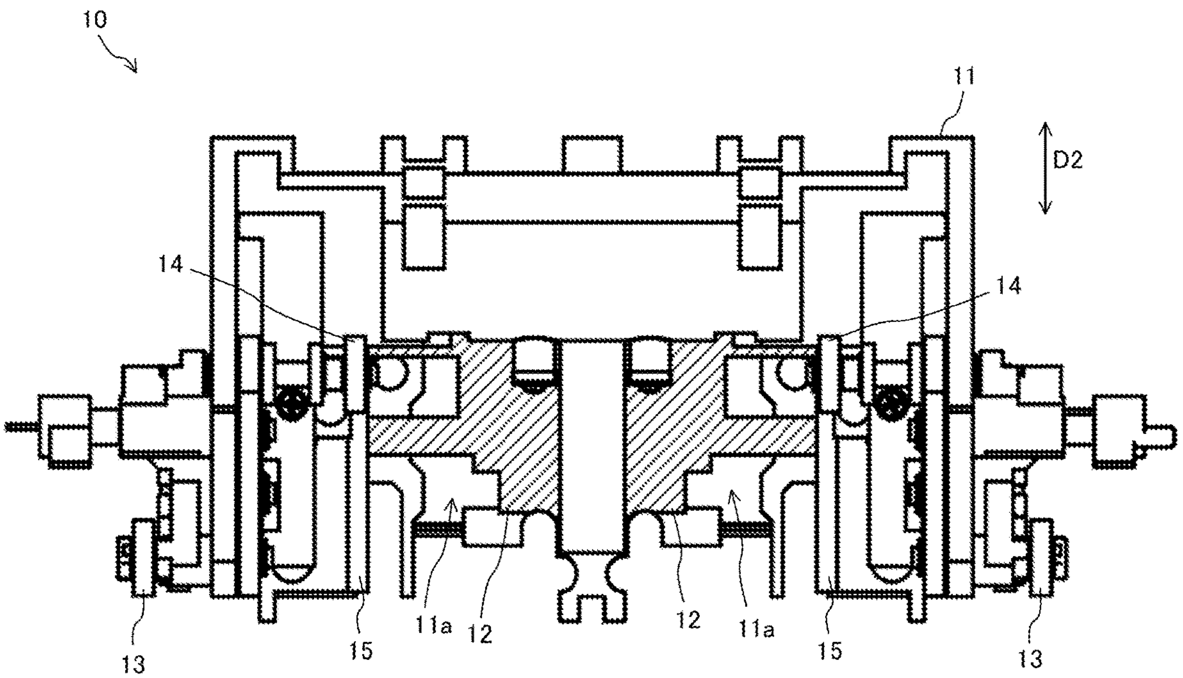
FIG. 5 is a view of a stage in the embodiment when viewed from the direction V in FIG. 3B.

FIG. 5 is a view of the stage 10 as viewed from the V direction in FIG. 3B.

Figure 6:
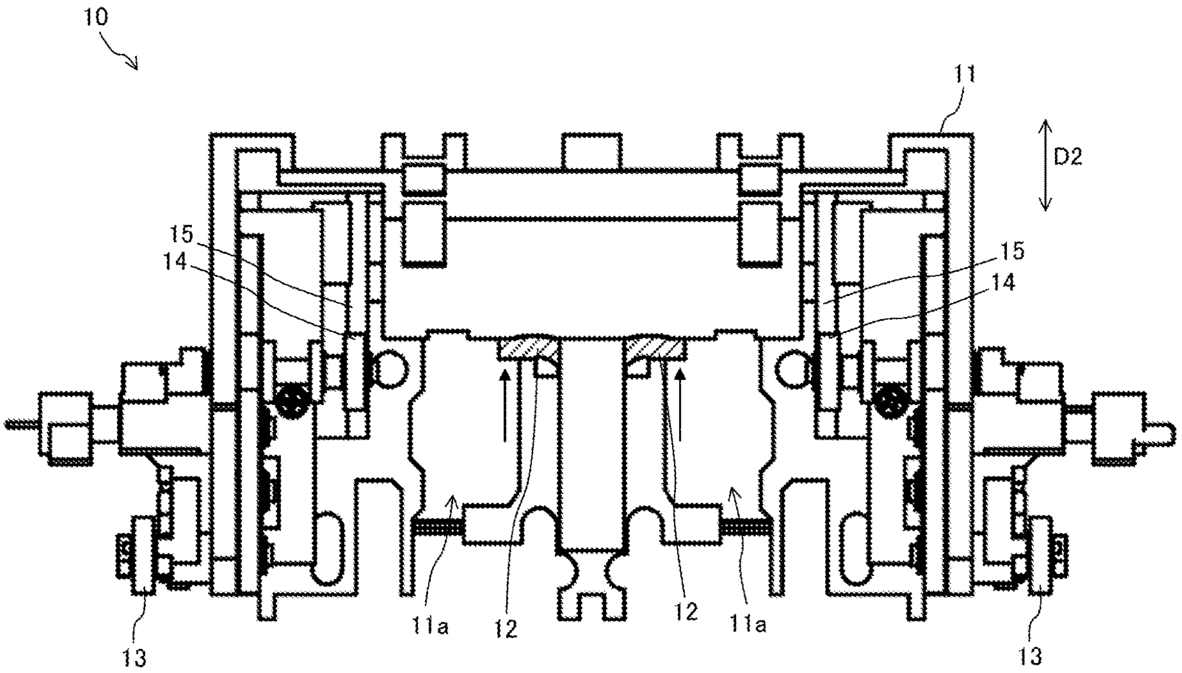
FIG. 6 is a view of the stage in the embodiment when viewed from the direction VI in FIG. 3C.

FIG. 6 is a view of the stage 10 as viewed from the VI direction in FIG. 3C.

Figure 7:
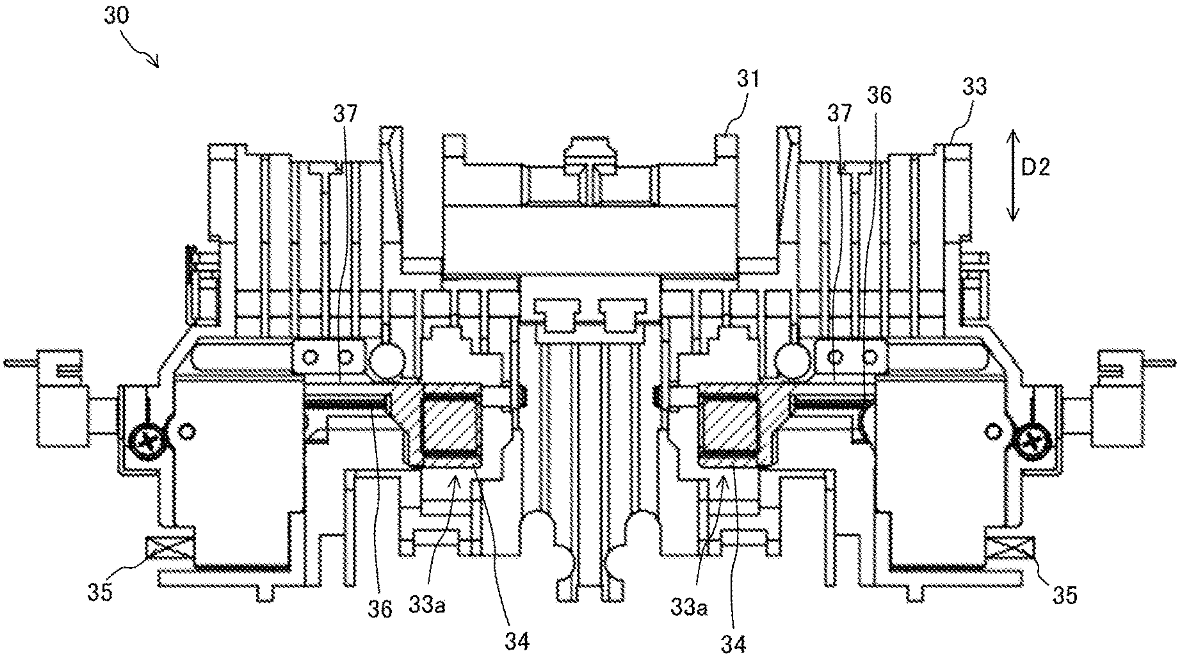
FIG. 7 is a view of a pusher in the embodiment when viewed from the direction VII in FIG. 4A.

FIG. 7 is a view of the pusher 30 when viewed from the direction VII in FIG. 4A.

Figure 8:
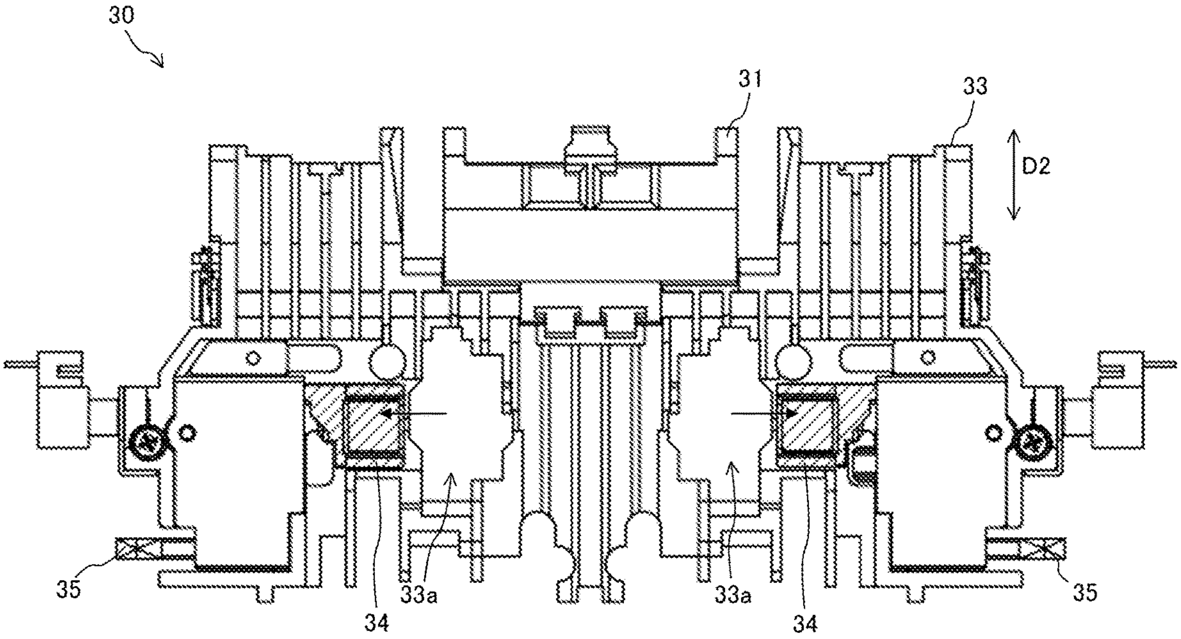
FIG. 8 is a view of the pusher in the embodiment when viewed from the direction VIII in FIG. 4B.

FIG. 8 is a view of the pusher 30 when viewed from the direction VIII in FIG. 4B.

Figure 9A:
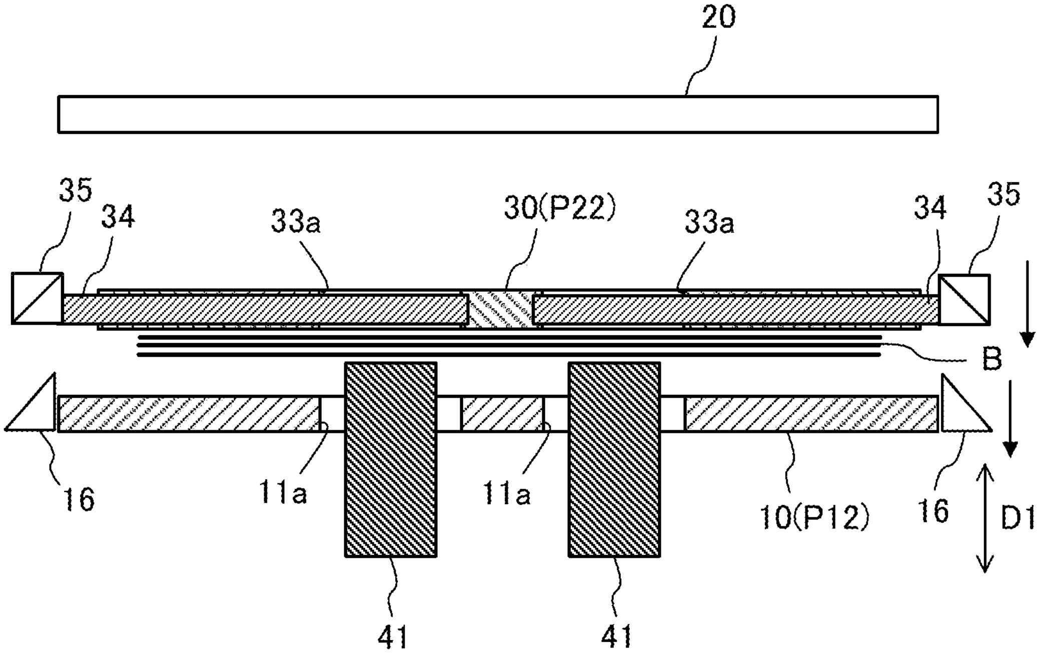
FIG. 9A is an explanatory view (1) for explaining opening and closing of second shutters of the pusher in the embodiment.
Figure 9B:
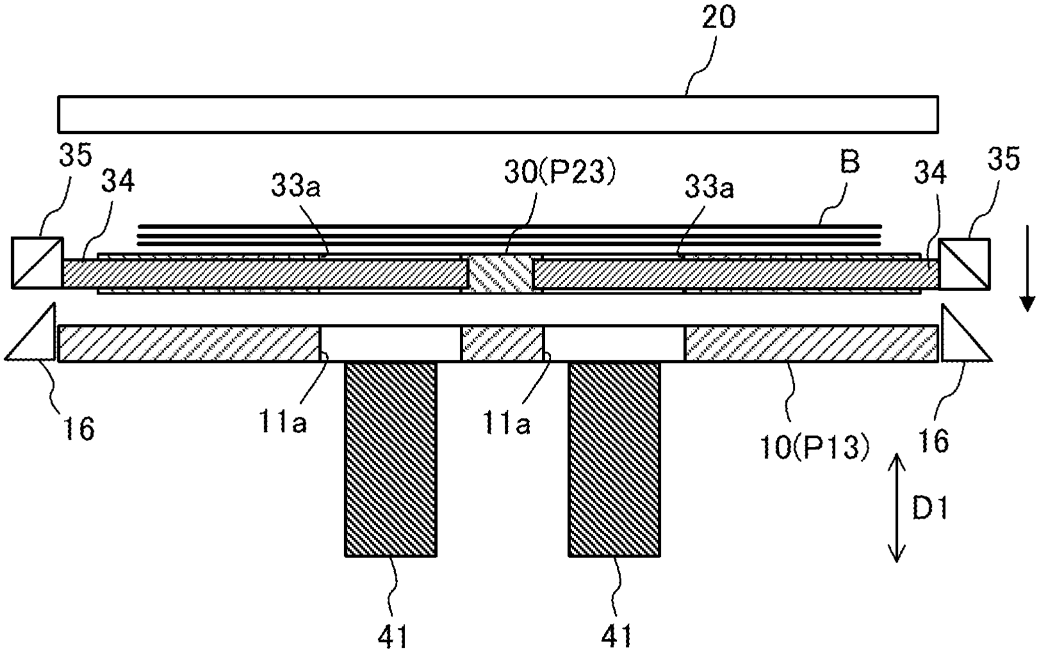
FIG. 9B is an explanatory view (2) for explaining the opening and closing of the second shutters of the pusher in the embodiment.
Figure 9C:
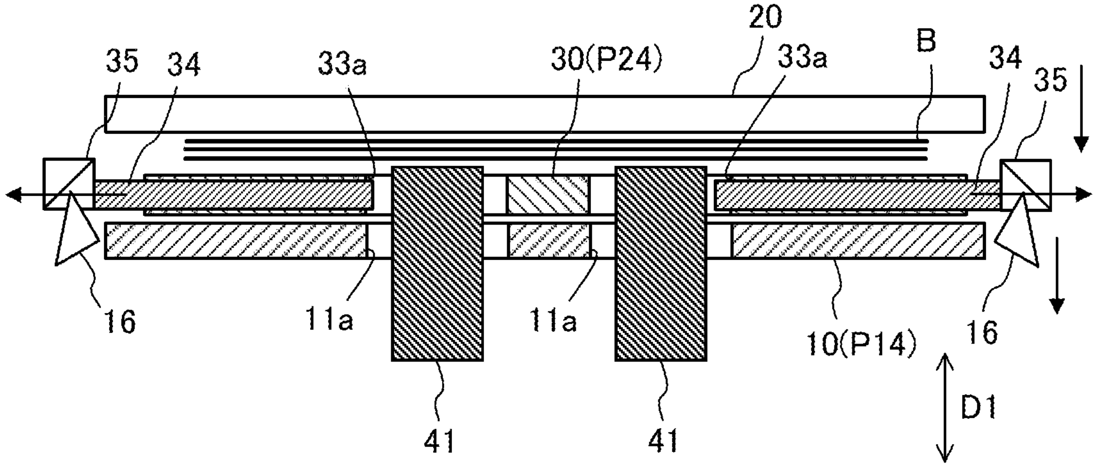
FIG. 9C is an explanatory view (3) for explaining the opening and closing of the second shutters of the pusher in the embodiment.

FIGS. 9A to 9C are explanatory diagrams for explaining opening and closing of second shutters 34 of the pusher 30.

FIG. 10 is a perspective view illustrating the banknote receiving portion 90.

First, configurations of the stage 10, the roof 20, the pusher 30, the first contact portion 80, and the banknote receiving portion 90 will be described.

As illustrated in FIG. 3A, the stage 10 and the roof 20 are arranged so as to be opposed to each other across the insertion space S1. In the insertion space S1, the banknote B is inserted from the insertion/taking-out port 61 of the front panel 60 indicated by a two-dot chain line in FIGS. 3A to 4B.

The stage 10 and the roof 20 are arranged to be inclined in the vertical direction and the horizontal direction so as to be positioned upward toward the front in parallel to an insertion/taking-out direction D2 in which the banknote B is inserted and taken out. Therefore, an opposing direction D1 in which the stage 10 and the roof 20 are opposed to each other is orthogonal to the insertion/taking-out direction D2, and is inclined in the vertical direction and the horizontal direction so as to be upward toward the rear side.

As illustrated in FIG. 5, the stage 10 includes a stage main body 11, two first shutters 12 (hatched portions), two gears 13, two gears 14, and two racks 15. Note that the stage 10 is an example of a first opposing portion.

As illustrated in FIGS. 3A to 3C, the stage 10 is arranged so as to be movable in the opposing direction D1 in which the stage 10 and the roof 20 are opposed to each other, to an insertion position P11 (see FIGS. 3A and 3B) at the time of inserting the banknote B and a conveyance position P12 (see FIG. 3C) at the time of conveying the inserted banknote B by pickup rollers 41 of the taking-in and conveying unit 40 to be described later. In addition, the stage 10 is also arranged so as to be movable to a taking-out position P13 (see FIG. 4A) at which the banknote B is taken out and a remaining banknote conveyance position P14 (FIG. 4B).

As illustrated in FIGS. 5 and 6, the stage main body 11 is provided with two first opening portions 11*a* that are penetrated by the pickup rollers 41 of the taking-in and conveying unit 40.

The two first shutters 12 openably close the first opening portions 11*a*.

The two gears 13 are respectively provided at left and right end portions of a lower end of the stage 10 (stage main body 11). When the stage 10 moves from the insertion position P11 illustrated in FIG. 3A to the conveyance position P12 illustrated in FIG. 3C, the two gears 13 mesh with two racks 42 of the taking-in and conveying unit 40 described later and rotate.

The two gears 14 rotate along with the rotation of the two gears 13.

The two racks 15 move up and down along with the rotation of the two gears 14. The two racks 15 are provided integrally with the first shutters 12, or are fixed to the first shutters 12.

Therefore, when the stage 10 moves from the insertion position P11 illustrated in FIG. 3A to the conveyance position P12 illustrated in FIG. 3C or the remaining banknote conveyance position P14 illustrated in FIG. 4B, the two gears 13 mesh with the two racks 42 of the taking-in and conveying unit 40 and rotate, so that the two gears 14 rotate, the two racks 15 ascend, and the two first shutters 12 ascend. As a result, as illustrated in FIG. 6, the two first shutters 12 open so as to open the two first opening portions 11*a*.

On the other hand, when the stage 10 moves from the conveyance position P12 illustrated in FIG. 3C or the remaining banknote conveyance position P14 illustrated in FIG. 4B to the insertion position P11 illustrated in FIG. 3A or the taking-out position P13 illustrated in FIG. 4A, the two gears 13 mesh with the two racks 42 of the taking-in and conveying unit 40 and reversely rotate, so that the two gears 14 reversely rotate, the two racks 15 descend, and the two first shutters 12 descend. As a result, as illustrated in FIG. 5, the two first shutters 12 close the two first opening portions 11*a*.

Here, the two gears 13, the two gears 14, and the two racks 15 of the stage 10 are an example of a first shutter opening/closing unit that opens the first opening portion 11*a* by meshing with each other and opening the first shutter 12 when the stage 10 moves from the insertion position P11 to the conveyance position P12 and the remaining banknote conveyance position P14. The two racks 42 of the taking-in and conveying unit 40 are an example of a first shutter opening/closing unit included in the taking-in and conveying unit 40.

Note that the opening/closing direction of the two first shutters 12 is not limited to the up-down direction, and may be the left-right direction. Further, when the two first shutters 12 are opened, they may move downward instead of upward. As described above, the opening/closing direction of the first shutter 12 is arbitrary. Although the two first opening portions 11*a* are provided according to the number of pickup rollers 41, one or three or more first opening portions 11*a* may be provided. In addition, when a single first shutter 12 closes the plurality of first opening portions 11*a*, the number of first shutters 12 may be smaller than the number of first opening portions 11*a*.

The roof 20 is movable in the opposing direction D1, and moves so as to approach the pusher 30 in order to sandwich the banknote B with the pusher 30 at the time of taking in and conveying the banknote B illustrated in FIG. 4B. Note that the roof 20 is an example of a second opposing portion.

As illustrated in FIG. 7, the pusher 30 includes a movable member 31, a rotating shaft 32 (see FIG. 3A), a pusher main body 33, two second shutters 34 (hatched portions), two fitting portions 35, two gears 36, and two racks 37.

The pusher 30 is an example of a partition portion arranged between the stage 10 and the roof 20 so as to be movable in the opposing direction D1 between the stage 10 and the roof 20.

As illustrated in FIG. 3A, the pusher 30 forms, with the stage 10, the insertion space S1 into which the banknote B is inserted from the insertion/taking-out port 61 at the insertion position P21.

As illustrated in FIG. 4A, the pusher 30 forms, with the roof 20, the taking-out space S2 in which the banknote B is taken out from the insertion/taking-out port 61 at a taking-out position P23.

In addition, the pusher 30 is also movable to a conveyance position P22 illustrated in FIG. 3C or the remaining banknote conveyance position P14 illustrated in FIG. 4B when the inserted banknote B is conveyed by the pickup rollers 41.

In addition, the pusher 30 includes a movable member 31 that is provided at a distal end on the insertion/taking-out port 61 side and is movable toward the stage 10 side (see FIG. 4A) and the roof 20 side (see FIG. 3A). As illustrated in FIG. 7, for example, the movable member 31 is preferably provided only in a part near the center of the pusher 30 (pusher main body 33) in the left-right direction (the left-right direction in FIG. 7) intersecting the opposing direction D1 and the insertion/taking-out direction D2.

As illustrated in FIG. 3A, the movable member 31 is supported so as to be rotatable about the rotating shaft 32. Further, the movable member 31 is preferably biased by an elastic body such as a torsion spring so as to maintain a position parallel to the stage 10 and the roof 20. A pressed projection 31*a* protruding downward (toward the stage 10) is provided on the movable member 31 on the side opposite to the insertion/taking-out port 61 across the rotating shaft 32.

As illustrated in FIGS. 7 and 8, the pusher main body 33 is provided with two second opening portions 33*a* which are penetrated by two pickup rollers 41 of the taking-in and conveying unit 40 described later.

The two second shutters 34 openably close the second opening portions 33*a*.

The two fitting portions 35 are respectively provided at left and right end portions of a lower end of the pusher 30 (pusher main body 33). In a case where the stage 10 and the pusher 30 are at the remaining banknote conveyance positions P14 and P24 illustrated in FIG. 4B, the two fitting portions 35 are pressed by fitting portions 16 in a state of being fitted to the fitting portions 16 of the stage 10 illustrated in FIG. 9C, so that the two fitting portions 35 move away from each other in the left-right direction.

The two gears 36 rotate in conjunction with the movement of the two fitting portions 35 away from each other in the left-right direction.

The two racks 37 move in the left-right direction as the two gears 36 rotate. The two racks 37 are provided integrally with the second shutters 34, or are fixed to the second shutters 34.

Therefore, when the two fitting portions 16 of the stage 10 move the two fitting portions 35 of the pusher 30 away from each other in the left-right direction, the two gears 36 rotate, and the two racks 37 together with the two second shutters 34 move away from each other in the left-right direction. As a result, as illustrated in FIG. 8, the second shutters 34 open so as to open the second opening portions 33*a*.

On the other hand, when the pusher 30 retreats from the remaining banknote conveyance position P24 illustrated in FIG. 4B, the two fitting portions 35 move so as to approach each other, so that the two gears 36 rotate reversely, and the two racks 37 move so as to approach each other in the left-right direction together with the two second shutters 34. Thus, as illustrated in FIG. 7, the second shutters 34 close the second opening portions 33*a*.

Here, in the example illustrated in FIGS. 9A to 9C, the two fitting portions 16 of the stage 10 are, for example, levers. When the stage 10 and the pusher 30 are at the remaining banknote conveyance positions P14 and P24 as illustrated in FIG. 9C, the two fitting portions 16 are rotated by being fitted to the two fitting portions 35, and the two fitting portions 35 are moved away from each other in the left-right direction.

On the other hand, in a case where the stage 10 and the pusher 30 are located at the conveyance positions P12 and P22 of the deposited banknote B as illustrated in FIG. 9A, and in a case where the stage 10 and the pusher 30 are located at the taking-out positions P13 and P23 when the banknote B to be withdrawn is taken out as illustrated in FIG. 9B, the fitting between the two fitting portions 16 and the two fitting portions 35 is released, and the two fitting portions 16 are returned to the original positions by, for example, a biasing force of a biasing means (not illustrated). In addition, the two fitting portions 35 also return to the original positions by, for example, a biasing force of a biasing means (not illustrated).

Herein, the two fitting portions 35, the two gears 36, and the two racks 37 of the pusher 30 are an example of a second shutter opening/closing unit that opens and closes the second shutters 34. It is desirable that the second shutter opening/closing unit be configured to open the second shutters 34 by being fitted to the stage 10 (fitting portion 16) and pressed by the stage 10 (fitting portion 16). However, for example, the second shutter opening/closing unit may be configured to open the second shutters 34 in conjunction with an operation in which the pusher 30 moves to the remaining banknote conveyance position P24 by being pressed at the remaining banknote conveyance position P24 by a member (not illustrated) provided inside the banknote deposit/withdrawal unit 1, or any mechanism may be adopted.

For example, two rollers provided at both left and right ends of the pusher 30 may be pressurized toward the center side in the left-right direction by a guide (not illustrated) while rotating along the guide at the time of movement of the pusher 30 at a position other than the remaining banknote conveyance position P24, so that the two second shutters 34 may be closed via the operation of the gears 36 and the racks 37 described above, and the two rollers may not be pressurized toward the center side in the left-right direction by the guide at the remaining banknote conveyance position P24, so that the two second shutters 34 may be opened via the operation of the gears 36 and the racks 37 described above. However, in this case, the pusher 30 is less likely to move in the opposing direction D1 due to the stiffness of the roller, and eventually, the two second shutters 34 may be less likely to open and close.

Note that the opening/closing direction of the two second shutters 34 is not limited to the left-right direction, and may be the up-down direction. Moreover, when opening, the two second shutters 34 may move not in such a mutually separating direction but in a mutually approaching direction. As described above, the opening/closing direction of the second shutters 34 is arbitrary. Although the two second opening portions 33*a* are provided according to the number of pickup rollers 41, but one or three or more second opening portions 33*a* may be provided. In addition, when a single second shutter 34 closes the plurality of second opening portions 33*a*, the number of second shutters 34 may be smaller than the number of second opening portions 33*a*.

The taking-in and conveying unit 40 illustrated in FIG. 3B includes the pickup rollers 41 and the racks 42. Although not illustrated in FIG. 3B, the two pickup rollers 41 and the two racks 42 are arranged (see FIGS. 9A to 9C for the two pickup rollers 41).

As illustrated in FIG. 3C, the two pickup rollers 41 convey the banknote B inserted into the insertion space S1 in a state of protruding from the two first opening portions 11*a* of the stage 10 toward the insertion space S1 (see FIG. 3A).

In addition, as illustrated in FIG. 4B, the two pickup rollers 41 convey the banknote B left in the taking-out space S2 in a state of protruding toward the taking-out space S2 (see FIG. 4A) from the two first opening portions 11*a* (see FIG. 5) of the stage 10 and the two second opening portions 33*a* (see FIG. 7) of the pusher 30.

Here, the taking-in and conveying unit 40 is an example of a conveying unit (conveyor) that conveys the banknote B (paper sheet) inserted in the insertion space S1 in a state of protruding from the first opening portions 11*a* of the stage 10 toward the insertion space S1, and conveys the banknote B left in the taking-out space S2 in a state of protruding from the first opening portions 11*a* of the stage 10 and the second opening portions 33*a* of the pusher 30 toward the taking-out space S2.

As illustrated in FIG. 3C, the two racks 42 mesh with the two gears 13 of the stage 10 as described above.

Note that the taking-in and conveying unit 40 may be arranged not on the stage 10 side but on the roof 20 side. In this case, the first opening portions 11*a* and the first shutters 12 are arranged on the roof 20 instead of the stage 10.

Meanwhile, in the banknote deposit/withdrawal unit 1, the stage 10 and the pusher 30 are positioned below the taking-out space S2 (the stage 10 is further positioned below the insertion space S1) unlike the roof 20, and thus foreign matter easily enters the inside of the banknote deposit/withdrawal unit 1 from the second opening portions 33*a* of the pusher 30 and the first opening portions 11*a* of the stage 10 as compared with the case where the roof 20 is provided with the first opening portions. However, as in the present embodiment, there is a case where the taking-in and conveying unit 40 is arranged not on the roof 20 side but on the stage 10 side due to restrictions on the device structure of the banknote deposit/withdrawal unit 1. In this case, in particular, foreign matter easily falls into the banknote deposit/withdrawal unit 1 from the second opening portions 33*a* and the first opening portions 11*a*. In the present embodiment, as described above, since the second shutters 34 that openably close the second opening portions 33*a* of the pusher 30 and the first shutters 12 that openably close the first opening portions 11*a* of the stage 10 are arranged, it is possible to prevent foreign matter from falling into the inside of the banknote deposit/withdrawal unit 1 from the second opening portions 33*a* and the first opening portions 11*a*.

As illustrated in FIG. 3A, the first contact portion 80 is a protrusion that is provided behind the insertion/taking-out port 61 and protrudes downward from the back surface of the front panel 60.

As illustrated in FIG. 10, the banknote receiving portion 90 includes four support members 91, a base portion 92, and four reinforcement portions 93. The banknote receiving portion 90 is arranged so as to be movable in the insertion/taking-out direction D2, that is, a direction approaching and separating from the taking-out port 61.

The support members 91 are arms that support the banknote B. The support members 91 are arranged in the taking-out space S2 so as to face the insertion/taking-out port 61 as illustrated in FIG. 4A.

The four support members 91 are fixed to the base portion 92. The base portion 92 is provided with a recessed portion 92*a* for avoiding interference with the pusher 30.

Each of the four reinforcement portions 93 is provided between each support member 91 and the base portion 92 to reinforce the support member 91, and has a triangular plate shape.

Hereinafter, the flow of the depositing operation and the remaining banknote taking-in operation of the banknote deposit/withdrawal unit 1 will be described.

As illustrated in FIG. 3A, the pusher 30 forms the insertion space S1 with the stage 10 at the insertion position P21 when the banknote B is inserted. At this time, the movable member 31 comes into contact with the first contact portion 80 and is pressed against the elastic force of the elastic body, so that the movable member 31 moves to be inclined toward the roof 20. As a result, the insertion space S1 (between the pusher 30 and the stage 10) becomes wider toward the insertion/taking-out port 61, so that the customer can easily insert the banknote B. Note that the movable member 31 may move so as to be inclined toward the roof 20 by, for example, power of a driving means (not illustrated).

As illustrated in FIG. 3B, the pusher 30 moves toward the stage 10 after completion of the insertion of the banknote B, and sandwiches the banknote B with the stage 10. Thereafter, as illustrated in FIG. 3C, the stage 10 moves obliquely downward toward the front together with the pusher 30 to the conveyance position P12 on the taking-in and conveying unit 40 side. As a result, as described above, as illustrated in FIG. 6, the two first shutters 12 of the stage 10 are opened, and the first opening portion 11*a* is exposed. Then, the banknote B is conveyed toward the conveying unit 111 illustrated in FIG. 1 by the taking-in and conveying unit 40 in a state where the two pickup rollers 41 of the taking-in and conveying unit 40 protrude from the two first opening portions 11*a* provided in the stage 10.

At the time of withdrawal of the banknote B, after the discharge-scheduled number of banknotes B is conveyed between the pusher 30 and the roof 20 by the discharge conveying unit 50 illustrated in FIG. 1, the pusher 30 moves toward the stage 10 together with the roof 20 as illustrated in FIG. 4A. At the time of taking out the banknote B, the pusher 30 forms the taking-out space S2 with the roof 20 at the taking-out position P23. At this time, the pressed projection 31*a* comes into contact with the stage 10 and is pressed against the elastic force of the elastic body, so that the movable member 31 moves so as to be inclined toward the stage 10. As a result, since the taking-out space S2 (between the pusher 30 and the roof 20) becomes wider toward the insertion/taking-out port 61, the customer can easily take out the banknote B.

Here, the stage 10 functions as an example of a second contact portion that moves the movable member 31 toward the stage 10 by coming into contact with the movable member 31. As described above, the movable member 31 may be moved so as to be inclined toward the stage 10 by, for example, power of a driving means (not illustrated). In addition, the movable member 31 may move so as to be inclined toward the stage 10 by coming into contact with the second contact portion other than the stage 10. The movable member 31 may be in contact with the stage 10 (second contact portion) at a portion other than the pressed projection 31*a*.

Thereafter, the support member 90 supporting the banknote B moves toward the insertion/taking-out port 61. Then, the customer takes out the banknote B.

When the customer forgets to take out the banknote B, as illustrated in FIG. 4B, the stage 10 moves obliquely downward toward the front to the remaining banknote conveyance position P14, and the pusher 30 moves obliquely downward toward the front to the remaining banknote conveyance position P24. As a result, as described above, as illustrated in FIG. 6, the two first shutters 12 of the stage 10 are opened, and the two first opening portions 11*a* are exposed. As illustrated in FIG. 8, the two second shutters 34 of the pusher 30 are opened, and the two second opening portions 33*a* are exposed. In addition, the roof 20 also moves obliquely downward toward the front so as to sandwich the banknote B left between the roof 20 and the pusher 30.

Thereafter, in a state where the two pickup rollers 41 of the taking-in and conveying unit 40 protrude from the two first opening portions 11*a* provided in the stage 10 and the two second opening portions 33*a* of the pusher 30, the left banknote B is conveyed toward the conveying unit 111 illustrated in FIG. 1 by the taking-in and conveying unit 40.

In the present embodiment described above, the automatic transaction apparatus 100, which is an example of a paper sheet handling apparatus, includes the stage 10 (an example of a first opposing portion), the roof 20 (an example of a second opposing portion), the pusher 30 (an example of a partition portion), and the taking-in and conveying unit 40 (an example of a conveying unit). The stage 10 and the roof 20 are arranged so as to be opposed to each other. The pusher 30 is arranged so as to be movable in the opposing direction D1 in which the stage 10 and the roof 20 are opposed to each other, forms the insertion space S1 in which the banknote B (an example of a paper sheet) is inserted from the insertion/taking-out port 61 (an example of an insertion port) with the stage 10, and forms the taking-out space S2 in which the banknote B is taken out from the insertion/taking-out port 61 with the roof 20. The taking-in and conveying unit 40 conveys the banknote B inserted in the insertion space S1 in a state of protruding from the first opening portions 11*a* of the stage 10 toward the insertion space S1, and conveys the banknote B left in the taking-out space S2 in a state of protruding from the first opening portions 11*a* of the stage 10 and the second opening portions 33*a* of the pusher 30 toward the taking-out space S2. The pusher 30 is arranged so as to be movable to the remaining banknote conveyance position P24 when the banknote B left in the taking-out space S2 is conveyed by the taking-in and conveying unit 40. In addition, the pusher 30 includes the second shutters 34 that openably close the second opening portions 33*a*, and the second shutter opening/closing unit (for example, the two fitting portions 35, the two gears 36, and the two racks 37) that opens the second opening portions 33*a* by opening the second shutters 34 in conjunction with the operation in which the pusher 30 moves to the remaining banknote conveyance position P24.

As described above, even when the second opening portions 33*a* through which the taking-in and conveying unit 40 (pickup rollers 41) passes are provided in the pusher 30, the second shutters 34 that close the second opening portions 33*a* are arranged, so that it is possible to prevent foreign matter from moving from the second opening portions 33*a* to the stage 10 side (insertion space S1 side) and the roof 20 side (taking-out space S2 side). In addition, the fitting portions 35 or the like, which are an example of a second shutter opening/closing unit, open the second shutters 34 in conjunction with the operation in which the pusher 30 moves to the remaining banknote conveyance position P24, so that it is possible to omit arrangement of a driving unit such as a motor, a power transmission mechanism that transmits power from the driving unit to the second shutters 34, and the like.

Therefore, according to the present embodiment, the second shutters 34 that close the second opening portions 33*a* of the pusher 30 can be opened with a simple configuration.

Further, in the present embodiment, the stage 10 is arranged so as to be movable to the remaining banknote conveyance position P14 when the banknote B left in the taking-out space S2 is conveyed by the taking-in and conveying unit 40, and the second shutter opening/closing unit is fitted to the stage 10 (fitting portions 16) and pressed by the stage 10 (fitting portions 16) to open the second shutters 34 when the stage 10 and the pusher 30 are at the remaining banknote conveyance positions P14 and P24.

As a result, since the fitting portions 35 of the pusher 30 are pressed by the stage 10 (fitting portions 16) moving to the remaining banknote conveyance position P14 together with the pusher 30, the second shutters 34 can be opened with a simple configuration as compared with the case where the fitting portions 35 are pressed by a member other than the stage 10 such as the periphery of the stage 10. In addition, since the fitting portions 16 press the fitting portions 35 in a state of being fitted to the fitting portions 35, the second shutters 34 can be reliably opened.

Furthermore, in the present embodiment, the stage 10 includes the first shutters 12 that openably close the first opening portions 11*a*, the stage 10 is arranged so as to be movable in the opposing direction D1 at the insertion position P11 at the time of inserting the banknote B, the conveyance position P12 at the time of conveying the banknote B by the taking-in and conveying unit 40, and the remaining banknote conveyance position P14, and each of the stage 10 and the taking and conveying unit 40 includes the first shutter opening/closing unit (for example, the two gears 13, the two gears 14, and the two racks 15, and the two racks 42) that opens the first opening portions 11*a* by opening the first shutters 12 by meshing with each other when the stage 10 moves from the insertion position P11 to the conveyance position P12 and the remaining banknote conveyance position P14.

As described above, even if the first opening portions 11*a* through which the taking-in and conveying unit 40 (pickup rollers 41) passes are provided in the stage 10, foreign matter can be prevented from entering the inside of the banknote deposit/withdrawal unit 1 through the first opening portions 11*a* from the insertion space S1 of the banknote B by arranging the first shutters 12 that close the first opening portions 11*a*. In addition, since the first shutters 12 can be opened and closed by engagement between the gears 13 of the stage 10 and the racks 42 of conveying unit 40, it is possible to omit arrangement of a driving unit such as a motor, a power transmission mechanism that transmits power from the driving unit to the first shutters 12, and the like.

Note that the present invention is not limited to the above-mentioned embodiment as it is, and can be embodied by modifying components thereof. For example, various inventions can be formed by appropriately combining a plurality of components disclosed in the present embodiment. As described above, various modifications and applications of the invention can be made without departing from the gist of the invention.

The invention claimed is:

1. A paper sheet handling apparatus, comprising:

a first opposing portion and a second opposing portion arranged to be opposed to each other;

a partition portion that is arranged so as to be movable in an opposing direction in which the first opposing portion and the second opposing portion are opposed to each other, forms an insertion space into which a paper sheet is inserted from an insertion port with the first opposing portion, and forms a taking-out space from which the paper sheet is taken out from the insertion port with the second opposing portion; and a conveyor that conveys the paper sheet put in the insertion space in a state of protruding toward the insertion space from a first opening portion of the first opposing portion, and conveys the paper sheet left in the taking-out space in a state of protruding toward the taking-out space from the first opening portion of the first opposing portion and a second opening portion of the partition portion, wherein the partition portion is arranged so as to be movable to a remaining banknote conveyance position when the paper sheet left in the taking-out space is conveyed by the conveyor, and wherein the partition portion includes a second shutter that openably closes the second opening portion, and a second shutter opening/closing unit that opens the second opening portion by opening the second shutter in conjunction with an operation in which the partition portion moves to the remaining banknote conveyance position.

2. The paper sheet handling apparatus according to claim 1, wherein the first opposing portion is arranged so as to be movable to the remaining banknote conveyance position when the paper sheet left in the taking-out space is conveyed by the conveyor, and wherein the second shutter opening/closing unit opens the second shutter by being fitted to the first opposing portion and pressed by the first opposing portion when the first opposing portion and the partition portion are at the remaining banknote conveyance position.

3. The paper sheet handling apparatus according to claim 2, wherein the first opposing portion includes a first shutter that openably closes the first opening portion, wherein the first opposing portion is arranged so as to be movable in the opposing direction to an insertion position at the time of inserting the paper sheet, a conveyance position at the time of conveying the paper sheet by the conveyor, and the remaining banknote conveyance position, and wherein each of the first opposing portion and the conveyor includes a first shutter opening/closing unit that opens the first opening portion by opening the first shutter by meshing with each other when the first opposing portion moves from the insertion position to the conveyance position and the remaining banknote conveyance position.

* * * * *